United States Patent
Kunishima

(10) Patent No.: US 10,539,185 B2
(45) Date of Patent: Jan. 21, 2020

(54) ROLLING BEARING FOR SLIDING DOOR

(71) Applicant: JTEKT CORPORATION, Osaka-shi, Osaka (JP)

(72) Inventor: Takeshi Kunishima, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/037,021

(22) Filed: Jul. 17, 2018

(65) Prior Publication Data

US 2019/0032715 A1 Jan. 31, 2019

(30) Foreign Application Priority Data

Jul. 28, 2017 (JP) .................... 2017-146524

(51) Int. Cl.
| | |
|---|---|
| *F16C 29/04* | (2006.01) |
| *F16C 33/58* | (2006.01) |
| *F16C 33/78* | (2006.01) |
| *B60J 5/06* | (2006.01) |
| *C08L 77/06* | (2006.01) |
| *F16C 33/64* | (2006.01) |

(Continued)

(52) U.S. Cl.
CPC .............. *F16C 33/586* (2013.01); *B60J 5/06* (2013.01); *C08L 77/06* (2013.01); *F16C 33/64* (2013.01); *F16C 33/7823* (2013.01); *F16C 35/077* (2013.01); *C08L 77/02* (2013.01); *F16C 13/006* (2013.01); *F16C 29/045* (2013.01); *F16C 2208/02* (2013.01); *F16C 2208/60* (2013.01); *F16C 2326/01* (2013.01)

(58) Field of Classification Search
CPC .......... F16C 9/06; F16C 9/166; F16C 35/077; F16C 13/00; F16C 13/006; F16C 13/02; F16C 13/022; F16C 2326/01; F16C 29/045; C08L 77/00; C08L 77/02; C08L 77/04; C08L 77/06; C08L 77/08; C08L 77/10; B60J 5/06; E05D 15/1047; E05D 15/1065

See application file for complete search history.

(56) References Cited

U.S. PATENT DOCUMENTS 5,375,933 A * 12/1994 Mizutani ................ F16C 19/52
 384/476
2007/0230849 A1* 10/2007 Naito ................... F16C 33/3875
 384/530

(Continued)

FOREIGN PATENT DOCUMENTS

| JP | H11-351249 A | 12/1999 |
|---|---|---|
| JP | 2007-315483 A | 12/2007 |

*Primary Examiner* — Phillip A Johnson
(74) *Attorney, Agent, or Firm* — Oliff PLC

(57) ABSTRACT

A rolling bearing for a sliding door includes an inner ring, an outer ring, a plurality of rolling elements arranged in a rollable manner in an annular space between the inner ring and the outer ring, and a jacket member formed of a resin composition and provided so as to cover the outer peripheral surface of the outer ring. The resin composition contains polyamide 66 and aramid fiber. The polyamide 66 has a number average molecular weight of 34000 to 60000. The number average molecular weight is measured by gel permeation chromatography using hexafluoroisopropanol (HFIP) as a solvent and poly (methyl methacrylate) (PMMA) as a reference material. The content of the aramid fiber is 5 to 25 mass %.

2 Claims, 3 Drawing Sheets

(51) Int. Cl.
*F16C 35/077* (2006.01)
*F16C 13/00* (2006.01)
*C08L 77/02* (2006.01)

(56) References Cited

U.S. PATENT DOCUMENTS

| | | | | |
|---|---|---|---|---|
| 2012/0055024 | A1* | 3/2012 | Kawano | F16C 35/077 |
| | | | | 29/898.01 |
| 2016/0298050 | A1* | 10/2016 | Kunishima | C10M 107/42 |
| 2017/0081498 | A1* | 3/2017 | Yoshimura | C08K 3/16 |
| 2018/0162069 | A1* | 6/2018 | Matsumoto | B29C 43/20 |

* cited by examiner

ROLLING BEARING FOR SLIDING DOOR

INCORPORATION BY REFERENCE

The disclosure of Japanese Patent Application No. 2017-146524 filed on Jul. 28, 2017 including the specification, drawings and abstract, is incorporated herein by reference in its entirety.

BACKGROUND OF THE INVENTION

1. Field of the Invention

The present invention relates to a rolling bearing for a sliding door.

2. Description of the Related Art

In an automobile including a sliding door, a rolling bearing for a sliding door is mounted on the sliding door in order to support a smooth opening and closing operation of the sliding door. The rolling bearing for a sliding door is also referred to as a door roller. As the rolling bearing for a sliding door, there is proposed, for example, a rolling bearing for a sliding door in which a jacket member using a polyacetal resin or a polyamide resin is provided on an outer peripheral side of an outer ring (see, for example, Japanese Patent Application Publication No. 11-351249 (JP 11-351249 A) and Japanese Patent Application Publication No. 2007-315483 (JP 2007-315483 A)).

The rolling bearing for a sliding door that is provided with the resin jacket member is excellent in its quietness and does not require a guide rail. Therefore, the cost can be reduced. In this respect, there is an increasing need for the rolling bearing for a sliding door. The jacket member is required to have high durability because the jacket member is brought into rolling contact with a vehicle body every time the sliding door is opened or closed. It is desirable to reduce the cost by reducing the number of steps for painting the sliding door. Therefore, the sliding door is required to be painted by passing through a painting line with the rolling bearing for a sliding door mounted on the sliding door. Thus, the rolling bearing for a sliding door is required to pass through a high-temperature painting furnace (for example, lower than 200° C.) without problems.

The rolling bearing for a sliding door that uses the polyacetal resin for the jacket member has durability. However, the melting point of the polyacetal resin is as low as about 165 to 175° C. Therefore, the rolling bearing for a sliding door that uses the polyacetal resin for the jacket member is melted when passing through the painting furnace. Thus, the sliding door cannot be painted by passing through the painting furnace with the rolling bearing for a sliding door mounted on the sliding door.

In the rolling bearing for a sliding door that uses the polyamide resin for the jacket member, the polyamide resin tends to excel the polyacetal resin in heat resistance. Therefore, the melting of the jacket member can often be avoided even when the sliding door is painted with the rolling bearing for a sliding door mounted on the sliding door. When the sliding door is painted by this method, however, creep of the jacket member cannot be avoided. A load caused by the self-weight of the sliding door is applied to the jacket member under a high-temperature atmosphere. Therefore, the occurrence of the creep of the jacket member hinders the smooth opening and closing operation of the sliding door. In order to avoid the creep when the polyamide resin is used for the jacket member, the inventors have contemplated mixing reinforcing fiber in a resin composition that forms the jacket member. However, the inventors' investigation reveals that the wear resistance of the jacket member deteriorates and the durability decreases when the reinforcing fiber is simply mixed.

SUMMARY OF THE INVENTION

It is one object of the present invention to provide a rolling bearing for a sliding door that includes a jacket member in which sufficient durability (wear resistance) can be secured while providing heat resistance and creep resistance that allow the sliding door to be painted by passing through a painting furnace at a treatment temperature lower than 200° C.

A rolling bearing for a sliding door according to one aspect of the present invention has the following features in its structure. That is, the rolling bearing for a sliding door includes an inner ring, an outer ring, a plurality of rolling elements arranged in a rollable manner in an annular space between the inner ring and the outer ring, and a jacket member formed of a resin composition and provided so as to cover an outer peripheral surface of the outer ring. The resin composition contains polyamide 66 and aramid fiber. The polyamide 66 has a number average molecular weight of 34000 to 60000. The number average molecular weight is measured by gel permeation chromatography (GPC) using hexafluoroisopropanol (HFIP) as a solvent and poly (methyl methacrylate) (PMMA) as a reference material. A content of the aramid fiber is 5 to 25 mass %.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
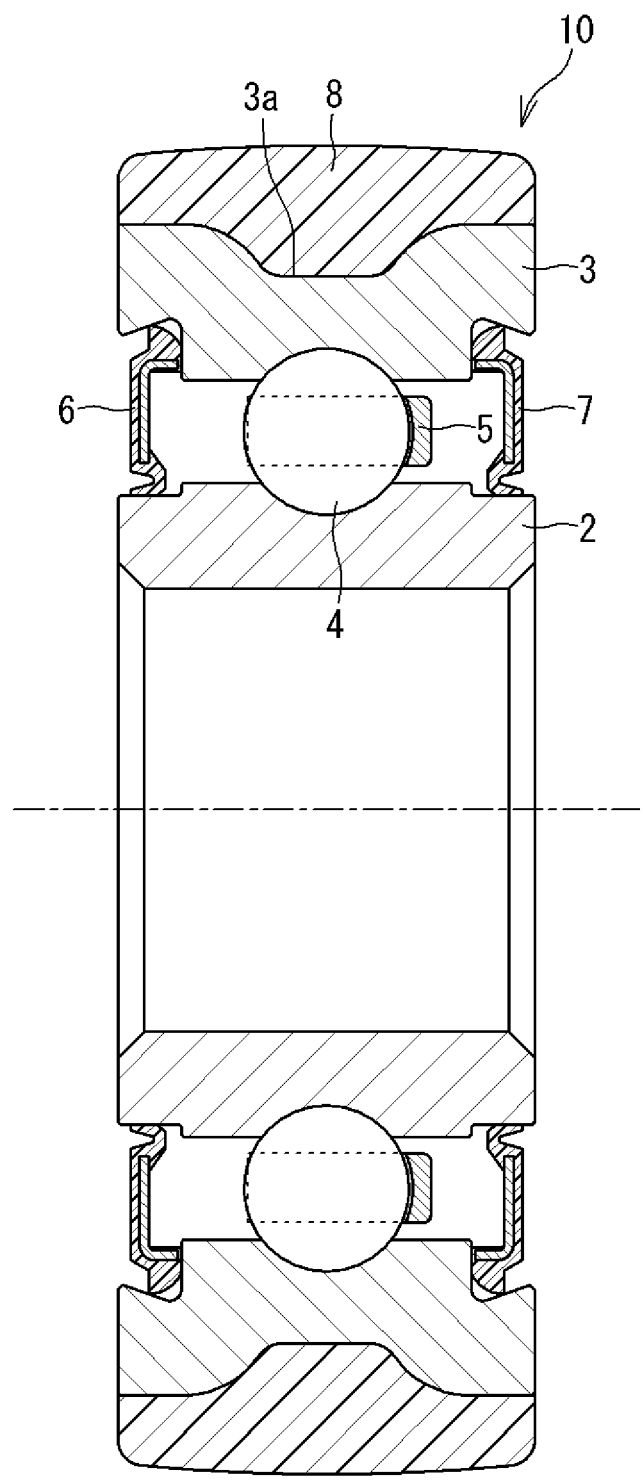
FIG. 1 is a sectional view illustrating a rolling bearing for a sliding door according to one embodiment of the present invention.

Embodiments of the present invention are described below with reference to the drawings. FIG. 1 is a sectional view illustrating a rolling bearing for a sliding door according to one embodiment of the present invention. A rolling bearing 10 for a sliding door according to this embodiment includes an inner ring 2, an outer ring 3, rolling elements 4, a cage 5, and hermetic seals 6 and 7. The rolling elements 4 are arranged in a rollable manner in an annular space between the inner ring 2 and the outer ring 3. The cage 5 retains the rolling elements 4. The hermetic seals 6 and 7 seal the annular space. The rolling bearing 10 for a sliding door further includes a jacket member 8 provided so as to cover the outer peripheral surface of the outer ring 3. The outer peripheral surface of the outer ring 3 has a groove 3a along a circumferential direction. Therefore, it is possible to reduce the occurrence of a case where the jacket member 8 provided so as to cover the outer peripheral surface of the outer ring 3 deviates in an axial direction (lateral direction in FIG. 1). The rolling bearing 10 for a sliding door is mounted on a sliding door such that the inner ring 2 is attached to a support shaft (not illustrated) of the sliding door. In the rolling bearing 10 for a sliding door in which the inner ring 2 is attached to the support shaft of the sliding door, the jacket member 8 is brought into contact with a mating member. Through rotation of the outer ring 3 relative to the inner ring 2, the jacket member 8 slides in a rollable manner relative to the mating member.

In the rolling bearing 10 for a sliding door, the jacket member 8 is formed of a resin composition containing polyamide 66 and aramid fiber. The polyamide 66 is a polymer having an amide bond (—NHCO—) in its backbone chain and consisting of a hexamethylene unit and an adipic acid unit. Examples of the polymer include a polymer obtained by polycondensation of hexamethylenediamine and adipic acid. In the embodiment of the present invention, the polyamide 66 only needs to be a resin containing polyamide 66 at a ratio of 95 mol % or more with respect to 100 mol % of the entire unit. The polyamide 66 may be not only a homopolymer of polyamide 66 but also a copolymer of polyamide 66 and a copolymerizable monomer or a macromolecular compound obtained by linking polyamides 66 via a condensation agent.

In the rolling bearing 10 for a sliding door according to this embodiment, the polyamide 66 contained in the resin composition that forms the jacket member 8 is polyamide 66 having a large molecular weight. The polyamide 66 has a number average molecular weight of 34000 to 60000. This number average molecular weight is measured by gel permeation chromatography (GPC) using hexafluoroisopropanol (HFIP) as a solvent and poly (methyl methacrylate) (PMMA) as a reference material (the number average molecular weight measured by this method is hereinafter referred to also as a number average molecular weight Mn(a)).

When the number average molecular weight Mn(a) is less than 34000, sufficient durability cannot be secured because the wear resistance decreases when the polyamide 66 is used in combination with aramid fiber. When the number average molecular weight Mn(a) is more than 60000, it is difficult to acquire the polyamide 66 at a low cost because solid phase polymerization treatment or the like is necessary after molding. The solid phase polymerization treatment is treatment in which the polymerization of the resin is accelerated by exposure to a high-temperature condition while applying a pressure to the resin composition in a vacuum or in an inert gas, thereby increasing the molecular weight of the resin.

The polyamide 66 having a large molecular weight can be acquired by, for example, the following method.

(1) Commercially available polyamide 66 having a number average molecular weight Mn(a) of 34000 or more is acquired. Specific examples of the commercially available product include Leona 1502S and Leona 1702 (produced by Asahi Kasei Corporation) and Zytel E40, Zytel E50, Zytel E51 HSB, and Zytel E53 (produced by DuPont).

(2) Reaction is caused so as to link polyamides 66 having a number average molecular weight Mn(a) of less than 34000 via a condensation agent, thereby synthesizing polyamide 66 having a large molecular weight. Any condensation agent may be used as long as the polyamides 66 can be linked together. Specific examples include a compound having a carbodiimide group (—N=C=N—) (hereinafter simply referred to also as carbodiimide). The carbodiimide may have one carbodiimide group or a plurality of carbodiimide groups. The carbodiimide may be any type of carbodiimide such as an aliphatic carbodiimide, an aromatic carbodiimide, or a carbodiimide modified product. The carbodiimide may be a macromolecular compound having a number average molecular weight of 3000 to 25000.

A commercially available product may be used as the carbodiimide. Specific examples include a Stabaxol series such as Stabaxol P and Stabaxol P100 (produced by Lanxess; aromatic polycarbodiimide compound), a Carbodilite series such as Carbodilite HMV-15CA (produced by Nisshinbo Chemical Inc.; aliphatic polycarbodiimide compound), and a TCC series (produced by Teijin Limited.; cyclic carbodiimide compound).

When the condensation agent is contained, the content of the condensation agent in the resin composition is preferably, for example, 0.5 to 3.5 mass % depending on the molecular weight of the condensation agent or the like. When the content of the condensation agent is less than 0.5 mass %, the increase in the molecular weight of polyamide 66 may fail to proceed sufficiently. When the content is more than 3.5 mass %, it is difficult to mold the jacket member stably because the viscosity of the resin composition increases.

In the resin composition, the content of the aramid fiber is 5 to 25 mass %. When the content of the aramid fiber is less than 5 mass %, creep of the jacket member cannot be suppressed under high temperature (for example, 200° C.). Therefore, the sliding door cannot be painted with the rolling bearing for a sliding door attached to the sliding door. When the content of the aramid fiber is more than 25 mass %, sufficient durability cannot be secured because the wear resistance decreases. When the content of the aramid fiber is more than 25 mass %, it is difficult to disperse the aramid fiber homogeneously in the resin composition.

The reason why the wear resistance decreases when the content of the aramid fiber increases is presumed as follows. In the door roller in which the jacket member slides in a rollable manner while being in point contact with the mating member, when the amount of fiber in the resin composition of the jacket member increases, the elastic modulus of the resin composition increases, and the contact pressure increases. In addition, when the aramid fiber itself drops off the jacket member, the aramid fiber acts as an abrasive against the jacket member. The content of the aramid fiber is preferably 7 to 20 mass % from the viewpoint of further reducing the possibility that the jacket member is worn.

The aramid fiber may be a para-aramid fiber or a meta-aramid fiber. The para-aramid fiber is preferred because the strength and stiffness of the fiber itself are high and the wear resistance is superior when the para-aramid fiber is used in combination with polyamide 66. Although the mean fiber diameter of the aramid fiber in the resin composition is not particularly limited, the mean fiber diameter is preferably 9 to 15 μm. Although the mean fiber length of the aramid fiber is not particularly limited, the mean fiber length is preferably 0.1 to 1 mm.

In addition to the polyamide 66 and the aramid fiber, the resin composition may further contain other components as long as the functions of the polyamide 66 and the aramid fiber are not hindered. For example, the resin composition may contain a lubricant or a colorant.

The rolling bearing for a sliding door can be manufactured through, for example, the following steps (1) to (3).

(1) First, a rolling bearing member including an inner ring, an outer ring, rolling elements, and a cage (rolling bearing without the jacket member of the rolling bearing for a sliding door according to the present invention) is manufactured by a publicly-known method.

(2) A raw material composition containing polyamide 66, aramid fiber, and the like is prepared separately from the step (1).

(3) Then, the raw material composition is subjected to injection molding to form a jacket member on the outer peripheral surface of the outer ring of the rolling bearing member.

In the step (2), the raw material composition is prepared by one of the following methods.

(a) Polyamide 66 having a number average molecular weight Mn(a) of 34000 or more and aramid fiber are kneaded.

(b) Polyamides 66 having a number average molecular weight Mn(a) of less than 34000, a condensation agent, and aramid fiber are kneaded.

It is appropriate that the raw material components be kneaded by using a publicly-known extruder (kneader) such as a twin-screw (multi-screw) extruder or a single-screw extruder.

When the raw material composition is prepared by the method (a), the polyamide 66 has a large molecular weight. Therefore, when the raw material components are kneaded so that a large amount of aramid fiber is dispersed homogeneously in the raw material composition, the polyamide 66 may be decomposed during the kneading, and the molecular weight may decrease. Thus, when the raw material composition is prepared by the method (a), the upper limit of the content of the aramid fiber in the raw material composition is preferably 15 mass %. This is because the polyamide 66 is easily decomposed during the kneading when the content of the aramid fiber is more than 15 mass %.

When the raw material composition is prepared by the method (b), the trouble (decomposition of polyamide 66) that may occur when the raw material composition is prepared by the method (a) is avoided. Even if the content of the aramid fiber contained in the raw material composition is more than 15 mass %, the aramid fiber can be dispersed homogeneously in the raw material composition. When the raw material composition is prepared by the method (b), the polyamides 66 having a number average molecular weight Mn(a) of less than 34000, the condensation agent, and the aramid fiber may be fed simultaneously into the extruder. It is preferable that the polyamides 66 and the aramid fiber be kneaded first and then the condensation agent be fed to further knead the raw material components. In this case, the molecular weight of the polyamide 66 is not very large during the period in which the aramid fiber is kneaded. Therefore, the aramid fiber can be dispersed homogeneously in the raw material composition without causing decomposition of the polyamide 66 even if the content of the aramid fiber is more than 15 mass %. After the aramid fiber is dispersed, reaction proceeds between the polyamides 66 via the condensation agent. Therefore, the aramid fiber is mixed homogeneously into polyamide 66 having a large molecular weight. When the raw material composition is prepared by the method (b), a kneader having a plurality of raw material feed ports (feeders) is used. It is preferable that the raw material composition be prepared by feeding the polyamides 66 and the aramid fiber through the same raw material feed port or different raw material feed ports and feeding the condensation agent through another raw material feed port located on a downstream side (nozzle side) with respect to the raw material feed port(s) where the polyamides 66 and the aramid fiber are fed.

In the step (3), the jacket member is formed by injection molding. The method for the injection molding is not particularly limited. It is appropriate that a publicly-known method be adopted. There is a concern that the fluidity of the raw material composition is poor because the raw material composition contains the polyamide 66 having a relatively large molecular weight (particularly when the raw material composition is prepared by the method (a) in the step (2)). In the injection molding, it is preferable that the following methods (A) to (C) be adopted in combination with each other as appropriate.

(A) A disk gate or a multiple-pin gate is adopted as a gate system, and the gate diameter is increased (for example, φ0.8 mm or more, preferably φ1 mm or more).

(B) A hot runner system is used to keep a high fluidity of the raw material composition up to a point immediately behind the gate.

(C) The mold temperature is increased (for example, 100° C. or higher, preferably 120° C. or higher).

By adopting those methods in combination with each other as appropriate, the following troubles can be avoided.

The gate is sealed at an early stage, resulting in generation of vacuum voids in the molded jacket member.

The jacket member is poor in roundness.

When the jacket member is formed in the step (3) by using the raw material composition prepared by the method (b), it is preferable that the step (3) be carried out under the condition that the reaction proceeds between the polyamides 66 via the condensation agent even after the raw material composition is injected into the mold. This case is suitable to increase the fluidity of the raw material composition during the injection molding. As the method for achieving this condition, for example, there may be adopted a method in which the condensation agent and the other components (polyamides 66 and aramid fiber) are kneaded in a short period of time and the injection molding is carried out promptly after the kneading.

Other embodiments are described below. As described in the first embodiment, it is important that the polyamide 66 contained in the jacket member has a large molecular weight in the rolling bearing for a sliding door according to the embodiment of the present invention. Instead of the number average molecular weight Mn(a) measured by the method described in the first embodiment, the molecular weight of the polyamide 66 may satisfy a value of a predetermined physical property related to a molecular weight measured by another method.

That is, the molecular weight of the polyamide 66 contained in the jacket member may be 53000 to 80000 as another number average molecular weight. This number average molecular weight is measured by the following method. A carboxyl group of the polyamide 66 is subjected to derivatization using trifluoroacetic anhydride (TFAA) into a macromolecular compound soluble in tetrahydrofuran (THF). The obtained macromolecular compound is dissolved in THF, and the number average molecular weight is measured by gel permeation chromatography (GPC) using THF as a solvent and polystyrene (PS) as a reference material (the number average molecular weight measured by this method is hereinafter referred to also as a number average molecular weight Mn(b)). Also in this case, the jacket member contains polyamide 66 having a large molecular weight that can attain actions and effects similar to those of the first embodiment of the present invention.

The polyamide 66 contained in the jacket member may have a limiting viscosity number [η] of 1.9 to 3.0 dl/g. In conformity to ISO 307, the limiting viscosity number [η] is measured by using a micro Ubbelohde viscometer while dissolving polyamide 66 in a solvent such as formic acid, sulfuric acid, or cresol. Also in this case, the jacket member contains polyamide 66 having a large molecular weight that can attain actions and effects similar to those of the first embodiment of the present invention.

Thus, the rolling bearing for a sliding door that includes the jacket member formed of the resin composition containing the polyamide 66 and the aramid fiber of 5 to 25 mass % can attain actions and effects similar to those of the first embodiment of the present invention when the polyamide 66 satisfies at least one of the number average molecular weight Mn(a), the number average molecular weight Mn(b), and the limiting viscosity number [η] within the ranges described above.

Evaluation of the rolling bearing for a sliding door using a test piece is described below.

Test Examples 1 to 3 and Comparative Test Examples 1 to 3

A mixture of polyamide 66, aramid fiber, and a condensation agent to be added as necessary was prepared in a composition shown in Table 1 by kneading with a twin-screw kneader TEM-26SX (manufactured by Toshiba Machine Co., Ltd.). Then, a Suzuki's friction and wear test piece in conformity to the method A of JIS K 7218 (ring-shaped test piece having an outside diameter of 25.6 mm, a bore diameter of 20 mm, and a height of 15 mm) was molded out of the obtained mixture by using a 100 t electric injection molding machine (manufactured by FANUC Corporation). The obtained molding was used as an evaluation test piece.

Figure 3:
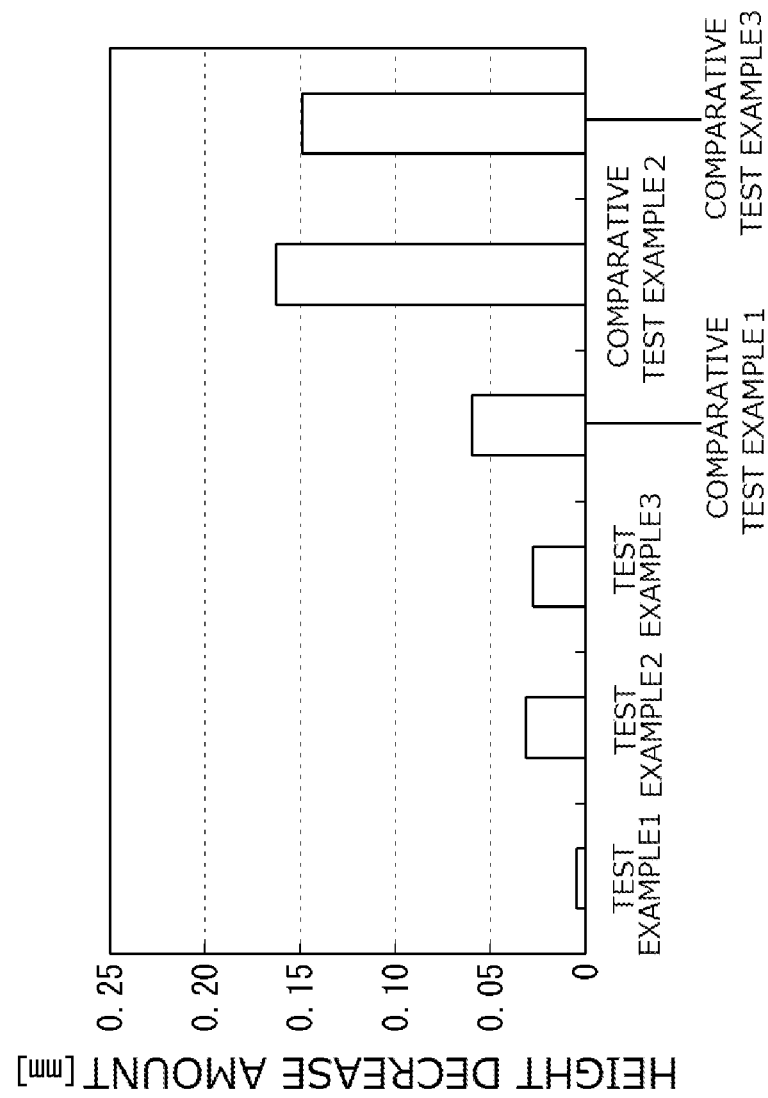
FIG. 3 is a graph illustrating results of the performance evaluation.

In "Test Example 3 and Comparative Test Example 3" and in "Comparative Test Example 1 and Comparative Test Example 2", the same types of polyamide 66 were adopted as raw resins, respectively.

amount of 0.05 mm or less is evaluated as "○", and the height decrease amount of more than 0.05 mm is evaluated as "×". Results are shown in Table 2 nd FIG. 3.

Detailed test conditions are as follows.
Metal roller: formed of SUJ2, φ3.5 mm, four pieces
Lubricant: grease (produced by NOK Kluber Co., Ltd.; TOPAS NB52)
Sliding speed: 1 m/s
Test temperature: RT
Test time: 4 h
Rotation condition: intermittent rotation involving drive of evaluation test piece about center line of bore diameter for 10 sec.⇒stop for 20 sec.

According to this friction and wear test, results correlated to the durable life of the rolling bearing for a sliding door can be obtained. The durable life tends to increase as the height decrease amount of the test piece decreases.

(2) Measurement of Molecular Weight of Polyamide 66

The number average molecular weight Mn(a), the number average molecular weight Mn(b), and the limiting viscosity number [η] were measured by the following methods.

(2-1) Number Average Molecular Weight Mn(a)

The polyamide 66 contained in the evaluation test piece was dissolved in HFIP, and the number average molecular weight Mn(a) was measured by GPC (using PMMA as a reference material).

(2-2) Number Average Molecular Weight Mn(b)

First, a carboxyl group of the polyamide 66 contained in the evaluation test piece was subjected to derivatization using trifluoroacetic anhydride (TFAA) into a macromolecular compound soluble in tetrahydrofuran (THF). Then, the polyamide 66 subjected to derivatization by the method described above was dissolved in THF, and the number

TABLE 1

|  |  | Test Example 1 | Test Example 2 | Test Example 3 | Comparative Test Example 1 | Comparative Test Example 2 | Comparative Test Example 3 |
| --- | --- | --- | --- | --- | --- | --- | --- |
| Polyamide 66 (raw resin) | Product number | Leona 1402S | Leona 1402S | — | — | — | — |
|  | Manufacturer | Asahi Kasei Corporation | Asahi Kasei Corporation | — | — | — | — |
|  | Number average molecular weight Mn(a) | 23000 | 23000 | 30000 or more | 23000 | 23000 | 30000 or more |
|  | Limiting viscosity number [η] (dl/g) | 1.4 | 1.4 | — | 1.4 | 1.4 | — |
| Aramid fiber | Product number | TR322U | TR322U | TR322U | TR322U | TR322U | TR322U |
|  | Manufacturer | Teijin Limited. | Teijin Limited. | Teijin Limited. | Teijin Limited. | Teijin Limited. | Teijin Limited. |
|  | Addition amount (mass %) | 10 | 20 | 10 | 10 | 20 | 20 |
| Condensation agent | Type | Aromatic CDI | Aromatic CDI | — | — | — | — |
|  | Product number | Stabaxol P-100 | Stabaxol P-100 | — | — | — | — |
|  | Manufacturer | Lanxess | Lanxess | — | — | — | — |
|  | Addition amount (mass %) | 2.50 | 2.50 | — | — | — | — |

(1) Roller Type Friction and Wear Test (Evaluation of Wear Resistance)

Figure 2:
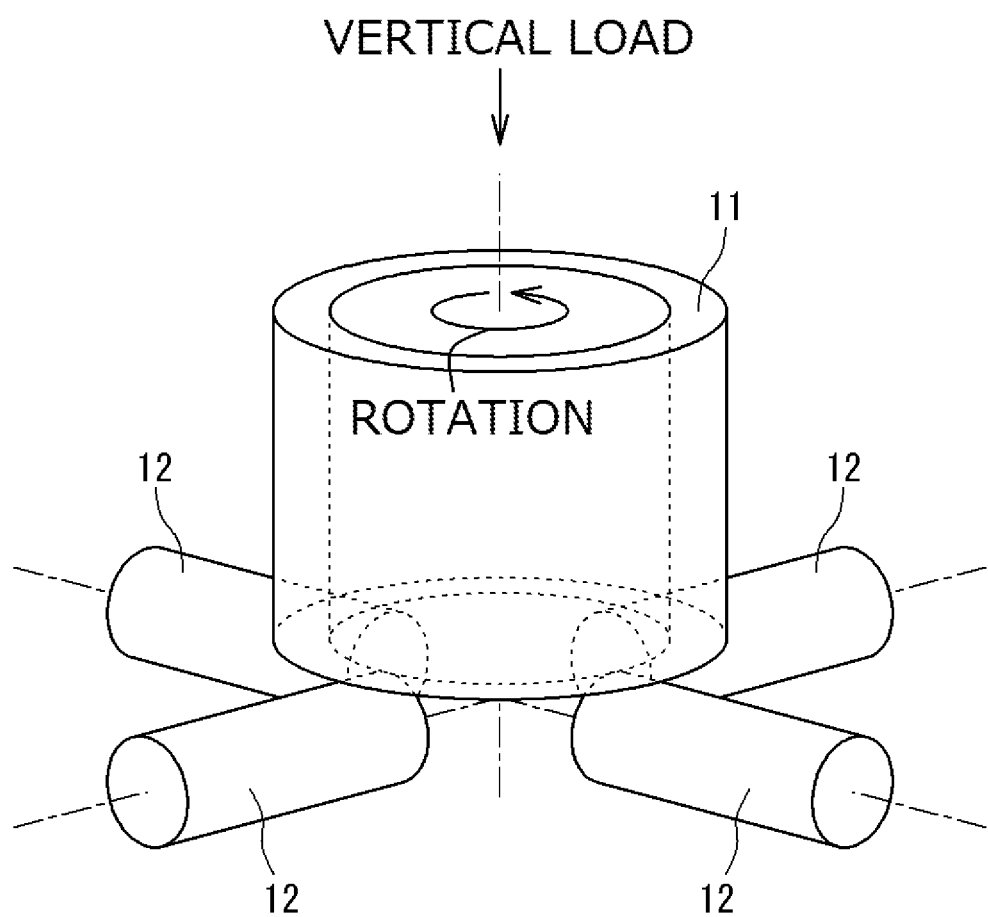
FIG. 2 is a diagram for describing an evaluation method adopted in performance evaluation.

As illustrated in FIG. 2, the end face of an evaluation test piece 11 is placed on the outer peripheral surfaces of four metal rollers 12 arranged horizontally on the same imaginary plane and radially at 90° with their central axes coinciding with the imaginary plane. The evaluation test piece 11 is slid against the metal rollers by rotating the evaluation test piece 11 about its central axis while applying a vertical load to the evaluation test piece 11. The height decrease amount of the evaluation test piece 11 is measured after an elapse of a predetermined time. The height decrease average molecular weight Mn(b) was measured by GPC (using polystyrene (PS) as a reference material).

(2-3) Limiting Viscosity Number [η]

The limiting viscosity number [η] was measured by a method in conformity to ISO 307. Specifically, formic acid was selected as a solvent, and a relative viscosity $\eta_{rel}$ was calculated based on a kinematic viscosity ratio between the solvent and a solution of the polyamide 66 contained in the evaluation test piece and controlled at 0.005 g/l. Then, a specific viscosity $\eta_{sp}$ was calculated based on the ratio of the obtained relative viscosity $\eta_{rel}$, and the specific viscosity $\eta_{sp}$ was divided by a concentration c. Thus, a reduced viscosity IV and the limiting viscosity number [η] were calculated.

TABLE 2

|  |  | Test Example 1 | Test Example 2 | Test Example 3 | Comparative Test Example 1 | Comparative Test Example 2 | Comparative Test Example 3 |
|---|---|---|---|---|---|---|---|
| Polyamide 66 (molding) | Number average molecular weight Mn(a) | 47000 | 49000 | 36000 | 25000 | 27000 | 19000 |
|  | Number average molecular weight Mn(b) | 66000 | 69000 | 55000 | 44000 | 46000 | 38000 |
|  | Limiting viscosity number [η] (dl/g) | 2.5 | 2.6 | 2.0 | 1.5 | 1.6 | 1.1 |
| Height decrease amount | (mm) | 0.005 | 0.032 | 0.028 | 0.06 | 0.163 | 0.149 |
|  | (Evaluation) | ○ | ○ | ○ | x | x | x |

The evaluation results of Test Examples 1 and 3 and Comparative Test Example 1 demonstrate that the molding containing the aramid fiber of 10 mass % is superior in the wear resistance as the molecular weight of the polyamide 66 increases. The evaluation results of Test Example 2 and Comparative Test Examples 2 and 3 demonstrate that even the molding containing the aramid fiber of 20 mass % is superior in the wear resistance as the molecular weight of the polyamide 66 increases. In Comparative Test Example 3, the polyamide 66 was decomposed during the kneading, and the molecular weight of the polyamide 66 contained in the molding (evaluation test piece) was smaller than the molecular weight of the polyamide 66 that was a raw resin.

The rolling bearing for a sliding door according to the present invention has heat resistance and creep resistance that allow the sliding door to be painted in a painting furnace, and also has sufficient durability.

What is claimed is:

1. A rolling bearing for a sliding door, the rolling bearing being configured to be mounted on the sliding door when the sliding door is painted by passing through a high temperature painting furnace, the rolling bearing comprising:

an inner ring;

an outer ring;

a plurality of rolling elements arranged in a rollable manner in an annular space between the inner ring and the outer ring; and a jacket member formed of a resin composition and provided so as to cover an outer peripheral surface of the outer ring, wherein the jacket member is configured to be brought into rolling contact with a vehicle body, the resin composition contains polyamide 66 and aramid fiber, the polyamide 66 has a number average molecular weight of 34000 to 60000, the number average molecular weight being measured by gel permeation chromatography using hexafluoroisopropanol as a solvent and poly (methyl methacrylate) as a reference material, and a content of the aramid fiber is 5 to 25 mass %.

2. The rolling bearing for a sliding door according to claim 1, wherein the content of the aramid fiber is 7 to 20 mass %.

* * * * *